United States Patent Office 3,516,948
Patented June 23, 1970

3,516,948
NEUTRON-ABSORBING GRAPHITIC PRODUCT AND METHOD OF PREPARATION
Jean Cledat, Moselle, Michel Moreau, Clichy, and Jean Rappeneau, Paris, France, assignors to Commissariat a l'Energie Atomique, Paris, France
No Drawing. Filed Mar. 14, 1968, Ser. No. 712,955
Claims priority, application France, Mar. 24, 1967, 100,327
Int. Cl. G21f 1/00
U.S. Cl. 252—478          12 Claims

ABSTRACT OF THE DISCLOSURE

The process consists in mixing powders of graphite and of boron nitride, dehydrated boron calcite or rare earth metal oxides, adding 15–30% of tar by weight, compacting the mass into articles and heating at a temperature of from 1000° C. to 1200° C. (to 1150° C. if boron calcite is used) for a time sufficient to coke the tar.

---

This invention relates to a method of fabrication of parts from a neutron-absorbing graphitic product as well as to a part which is produced by this method.

Especially in fast reactors, products in which neutron-absorbing compounds are associated with graphite have already been employed as materials for shielding against neutrons, boron compounds or rare-earth compounds having been mainly used for this purpose. This association is of particular interest since graphite slows down the neutrons which are captured by the boron nuclei or the rare-earth nuclei. However, neutron-absorbing materials produced in accordance with the methods adopted up to the present time have been found to suffer from a number of disadvantages.

(1) The products in which boron is associated with graphite have been prepared by adding a boron compound to a carbonaceous mixture, then by carrying out a graphitization process at high temperature: in this case, no matter which boron compound is used as starting material, only boron carbide remains and coexists with the graphite after transition to the temperature of conversion of carbon to graphite which is higher than 2200° C. However, boron carbide is highly abrasive, with the result that machining of the end product is an arduous and costly process which is attended by rapid wear of equipment.

Some attempt has also been made to impregnate parts of porous graphite with a boron compound. But it has been found that there does not exist any boron compound which has good resistance to moisture and to irradiation and which can also be introduced into the pores of the graphite by impregnation.

Finally, it has been proposed to mix graphite powder with boron oxide or with borax, to shape the mixture by pressing and to bake the product at a temperature below the graphitization point. Unfortunately, borax and the boron oxides are hygroscopic products. Owing to the existence of transformation points, the products obtained can therefore be employed only up to about 600° C. However, the temperatures which are attained in practice within the heat-exchanger shielding of "integrated" fast reactors are liable to be in excess of this value. Moreover, a whitish efflorescence develops at the surface of any part thus formed when exposed to radiation in a high neutron flux.

(2) In regard to the rare earths, it has been proposed to add them in the form of oxide to the carbon powder, then to heat the mixture to the graphitization temperature. But at these temperatures, the rare earth oxides are reduced, thereby losing the properties of stability in air and non-hygroscopicity which are essential for the purpose of ensuring complete inalterability of the product obtained. It has also been proposed to impregnate parts of porous graphite with salts of rare earths, especially with acetates: the parts thus produced do not possess the degree of stability which is essential if they are to be heated to a high temperature or subjected to high doses of neutron irradiation.

The present invention has for its object to provide of a method of fabrication of neutron-absorbing graphitic products which contain boron or rare earths in a stable form, which do not cause any dislocation of the part under irradiation, and which permit the graphitic product to retain satisfactory mechanical properties for machining purposes.

To this end, the invention proposes a method of fabrication of parts formed from a neutron-absorbing graphitic product which comprises intimate mixing of artificial graphite powder with the powder of a neutron-absorbing compound consisting of boron nitride, dehydrated borocalcite or a rare-earth oxide, addition to the mixture of a carbonizable binder such as coal-tar pitch in a sufficient quantity to constitute a paste, forming the paste to the shape of the part, and baking the part without exposure to air over a period of time which is sufficient to carbonize the binder and at a temperature in the range of 900° C. to 1700° C. but below 1150° C. if the neutron-absorbing compound consists of borocalcite.

Irrespective of the neutron-absorbing compound empolyed, the finished parts can be heated to a temperature in excess of 600° C. and subjected to irradiation in high neutron and gamma fluxes without any deleterious effects. The choice of neutron-absorbing compound will therefore be governed by the application for which the part is intended, special consideration being given to the following indications:

The use of boron nitride makes it possible to fabricate parts having a high boron content which can readily attain 15% by weight, and the part obtained can still be machined easily; highly effective shields can thus be formed, particularly as boron can be enriched with the boron-10 isotope.

The use of borocalcite entails the lowest capital expenditure of all the neutron-absorbing compounds which may be contemplated. On the other hand, in view of the fact that borocalcite is present in the starting mixture only in a small proportion and contains a number of elements other than boron which are heavier than this latter, borocalcite does not make it possible in practice to produce parts having a boron content greater than 6%.

The rare-earth oxides permit the fabrication of parts which can be irradiated to very high doses. In fact, in contradistinction to the boron products, the rare-earth oxides do not give rise to helium evolution by reaction ($n$, $\alpha$). It will therefore be possible to make use of parts containing rare-earth oxides near the core of a fast reactor or even to form control rods from this material.

In the application last mentioned, it will be an advantage to employ oxides containing a high proportion of the rare earths which have a particularly high neutron-capture cross-section (especially gadolinium).

The fabrication of neutron-absorbing graphitic products in accordance with the invention is carried out in a similar manner, whether the neutron-absorbing compound is boron nitride or a rare-earth oxide. Thus, artificial graphite which has been comminuted to powder is mixed in suitable proportions with the neutron-absorbing compound which has also been reduced to powdered form. The mixing operation is carried out in a heating mixer at a temperature which is higher than 100° C. and preferable lower than 150° C. in order to eliminate the water content.

The particle size of the graphite and of the compound must be chosen so as to endow the parts with sufficient texture and strength. As a general rule, the compound will be employed in the form of powder having a particle size of less than $80\mu$ (particles of less than 200-mesh—AFNOR series).

The graphite powder can be made up of two parts, namely one part having a particle size of less than $80\mu$ and another part having a particle size within the range of 0.5 to 1.5 mm. In order to facilitate subsequent extrusion, a fraction of the graphite which is equal at a maximum value to 10% of the total mass of the mixture can be replaced by lamp-black.

If the neutron-absorbing compound employed is boron nitride, it is possible to attain a proportion corresponding to approximately 6% boron in the final product; if a rare-earth oxide is employed, a proportion of the order of 15% in the dry mixture usually provides a sufficient absorption capacity, although this amount can be increased to about 20%.

Once the neutron-absorbing compound has been completely dispersed, there is added to the mixture a binder (coal-tar pitch or petroleum asphalt) in a sufficient quantity to form a paste. As a rule, a proportion of binder varying between 15% and 30% by weight of the dry mixture of graphite and neutron-absorbing compound is sufficient to achieve this result. The paste is mixed and triturated in a mill which is heated to a temperature slightly above 100° C. (in order to eliminate the water and to prevent setting of the binder) until sufficient compactness is obtained to permit the preparation of parts which retain their cohesion after shaping. The shaping operation can be carried out either by hot extrusion or press-forming under pressures higher than 100 bar; extrusion can be carried out under a pressure of the order of 900 bar or press-forming can be carried out under a pressure of the order of 135 bar in the case of parts containing nitride or rare-earth oxides. Lower values could be adopted (of the order of 300 bar in the case of extrusion or 100 bar in the case of press-forming) in the case of parts containing a proportion of borocalcite which is higher than the nitride content.

The parts thus obtained are transferred to an open-flame furnace in which baking is carried out without exposure to air, preferably beneath a layer of coke powder, at a temperature below that at which the reactions of reduction of boron nitride or of the rare-earth oxides by carbon take place at an appreciable rate. Said temperature must nevertheless be sufficient to carbonize the binder and is therefore higher than 900° C. Inasmuch as boron nitride remains stable in the presence of carbon up to a temperature above 200° C., the terminal baking stage should preferably be carried out at a temperature which is as close as possible to this value, namely between 1000 and 1200° C. By way of example, the temperature can be increased at a rate which does not exceed 50° C. per hour up to about 600° C., then between 15 and 25° C. per hour up to a level temperature stage which is comprised between 1100° C. and 1200° C., this temperature being subsequently maintained for a period of 8 to 12 hours. This operation can be carried out in a continuous kiln in a number of chambers.

By way of non-limitative example, it can be noted that cylindrical blocks 250 mm. in diameter and 1500 mm. in length and bricks measuring 80 mm. across the sides and 1000 mm. in length have been fabricated as follows:

EXAMPLE 1

In a mixer heated to 150° C., there were intimately mixed:

| | Percent |
|---|---|
| Lamp-black | 10 |
| Graphite powder of less than $80\mu$ | 20 |
| Artificial graphite powder having a particle size between 0.5 and 1.5 mm. | 50 |
| Industrial boron nitride (slightly overstoichiometric in boron) | 20 |

The above mixture received an addition of coal-tar pitch in a proportion of 30% of the total weight of the graphite and nitride powders.

After mixing in the hot state, the bricks were prepared by extrusion and the blocks by press-forming. These parts were then placed in a kiln and heated progressively to 1200° C., then maintained at this temperature over a period of 8 hours. During this baking stage, wastage by burning (due to carbonization of the binder) was of the order of 50%. The end product contained nearly 6% by weight of boron, had a specific gravity of the order of 1.65 and a themal conductivity comprised between 0.04 and 0.05 cal./cm./sec./° C.

EXAMPLE 2

The same method was applied to a mixture containing

10% by weight of lamp-black,
20% by weight of artificial graphite of less than $80\mu$,
53% by weight of artificial graphite powder having a particle size between 0.5 and 1.5 mm.,
17% of rare-earth oxides.

The rare-earth oxides were supplied in the form of an industrially available mixture containing:

$SM_2O_3$: 48% by weight
$Gd_2O_3$: more than 3%
$Ca_2O_3$: less than 3%
Oxides other than rare earths: complements.

The presence of a high proportion of Sm and Gd guaranteed a high capture cross-section.

A proportion of 31% by weight of coal-tar pitch was added to the mixture thus formed. The following stages were identical with those described in Example 1. The products obtained had a specific gravity which was slightly higher than in the previous instance, namely of the order of 1.80.

When the neutron-absorbing compound selected is borocalcite, a limitation is imposed by the fact that a temperature of 1150° C. cannot be exceeded during baking if fusion and decomposition of the borocalcite are to be avoided. Furthermore, in order to ensure stability of the part, the borocalcite must be dehydrated prior to mixing. As is generally known, borocalcite is a borate of natural lime which has the theoretical formula $2CaO, 3B_2O_3, 5H_2O$, but which may contain sodium in trace quantities substituted for the calcium. The sodium content, however, must essentially remain very low in order to permit the use of borocalcite as a neutron-absorbing compound. This product, which contains approximately 21% water, is dehydrated by maintaining at about 600° C. Fabrication can then proceed in the same manner as indicated hereinabove on condition that the temperature does not exceed 1150° C.

By way of example, the following process has been carried out in order to form parts which are similar to those considered in the foregoing.

EXAMPLE 3

There were mixed at a temperature of 100° C.:

| | Percent by wt. |
|---|---|
| Graphite powder having a particle size of less than 80μ | 16 |
| Graphite having a particle size between 0.5 and 1.5 mm | 40 |
| Dehydrated borocalcite in the form of a powder having a particle size of less than 100-mesh, that is to say, less than 200μ | 44 |

To 100 parts of the mixture by weight, there were added 31 parts of coal-tar pitch and the aggregate was mixed and triturated in a heated mill so as to form a paste and make it sufficiently compact to form parts. This paste was hot-extruded under a pressure of the order of 300 kg./cm² so as to form square-section bricks and press-formed under a pressure of the order of 100 kg./cm² so as to form cylindrical blocks. The parts thus obtained were baked under coal dust in an open-flame furnace, the temperature being progressively increased to 1000–1100° then maintained at this level stage for a period of 8 to 12 hours. Under these conditions of temperature, the borocalcite undergoes neither decomposition nor fusion.

The parts thus obtained exhibited the following properties:

Density: 1.50 to 1.55 kg.
Open porosity: of the order of 32%
Resistivity: 6,000 to 11,000 microhms/cm.³
Thermal conductivity: 0.015 to 0.030 cal./cm./sec./° C.
Compressive strength: 230 to 310 kg./cm.²

As a result of the loss by burning of a proportion of the order of one-half of the binder, the parts obtained contained approximately 5% by weight of boron. It is difficult to increase this proportion to any substantial extent since the percentages of borocalcite contained in the starting mixture would then be excessive. It can be considered that the value of 6% constitutes a maximum in practice. Under these conditions, the parts obtained are not subject either to re-hydration or desorption according to the hygroscopic state of the surrounding atmosphere; and this holds true both when they are heated to a temperature which can attain 60° C. and when they are subjected to irradiation.

The parts obtained by means of the methods hereinabove defined exhibit common properties which makes their use particularly attractive, as is now discussed.

By virtue of the fact that such parts have a "baked graphitic" structure with initial crystal defects which increase only slightly in number and extent under irradiation, their thermal conductivity decreases relatively little under the action of accumulated doses. It must be borne in mind that the graphites have high initial values of thermal conductivity which, on the contrary, fall very sharply under irradiation and come close to those of the product of the graphitic products in accordance with the invention which are formed by an agglomerate of graphite powder bonded by coke derived from the binder. Thus, the use of graphite would make it necessary to modify progressively the rate of coolant flow through the shielding. The machinability of the product is nevertheless very close to that of graphite.

The "baked graphitic" structure of the product offers a further advantage. Whereas the graphites, after slight shrinkage, are subjected under irradiation to substantial swelling which is related to the appearance of defects, the baked graphitic products continue to shrink slightly under increasing irradiation doses, even in the case of high doses. Although some expansion might be expected to occur at particularly high doses, it does not seem likely that such values will in fact be attained in the present state of knowledge. And, in practice, if parts which are fabricated from neutron-absorbing products are placed within a metallic cladding for such a purpose as to protect them against the action of a coolant (such as liquid metal, for example), it is important to ensure that no substantial expansion is liable to arise, as otherwise there would be a potential danger of failure of the cladding.

By virtue of their excellent mechanical porperties and good resistance both at high temperatures and under irradiation, the parts obtained by means of the method according to the invention find a large number of applications; among these can be mentioned in particular the fabrication of shielding for fast reactors of the integrated heat exchanger type, the presence of shields being required in zones at temperatures in excess of 500° C.

We claim:

1. A process for making neutron absorbing articles, comprising the steps of: intimately mixing powders of artificial graphite and of a neutron absorbing compound selected from the group consisting of boron nitride, dehydrated boron calcite and oxides of rare earth metals, adding to the mixture a carbonisable binder selected from the group consisting of pitch and cool tar in proportion sufficient to form a pasty mass, compacting said mass into articles, and heating said articles to a temperature sufficient to carbonise the binder while out of contact with an oxidizing atmosphere, said temperature being lower than 1700° C. and lower than 1150° C. if the compound is boron calcite.

2. A process according to claim 1, wherein said graphite powder size is smaller than 1.5 mm. and said compound powder is smaller than 80μ.

3. A process according to claim 1, wherein the relative proportions of mixture and binder are of 15/100 to 30/100.

4. A process according to claim 2, wherein said artificial graphite consists of particles smaller in size than 80μ and artificial graphite particles of from 0.5 to 1.5 mm.

5. A process according to claim 1, wherein during said heating step the articles are maintained in a flame furnace at a temperature of from 1000° C. to 1200° C. for 8 to 12 hours under a layer of powdered coke.

6. A process according to claim 1, wherein said mass is compacted into articles by extruding under a pressure of about 900 bars.

7. A process according to claim 1, wherein said mass is compacted into articles by pressing it in a die under a pressure of about 135 bars.

8. A process for making a neutron absorbing article comprising the steps of: intimately mixing pulverized graphite and a pulverized compound selected from the group consisting of dehydrated boron calcite and boron nitride; adding a carbonisable binder selected from the group consisting of tar and pitch; pressing the mixture at a pressure sufficient to shape it into bodies; and heating said bodies at a temperature of from 1000° C. to 1200° C. for a time sufficient to carbonize said binder, said temperature being lower than 1150° C. if the compound is boron calcite the percentage of said compound in the mixture being such that the boron content of the article is of from 1% to 6% by weight.

9. A neutron absorbing article, for use as a shield against fast neutrons or as a fast reactor control member, consisting essentially of a compact body of artificial graphite powder in a matrix of coke resulting from the carbonisation of pitch or tar, having powder of boron nitride, dehydrated boron calcite or oxide of rare earth metals dispersed therein.

10. A neutron absorbing article according to claim 9, wherein the boron content is of from 1 to 6% by weight, the boron being present as boron calcite.

11. A neutron absorbing article according to claim 9, wherein the boron content is of from 1 to 15% by weight, the boron being present as boron nitride.

12. A process according to claim 4, wherein lamp black is added to said graphite in proportion not exceeding 10% by weight of the mixture.

References Cited
UNITED STATES PATENTS

| | | |
|---|---|---|
| 2,527,596 | 10/1950 | Shea et al. |
| 2,748,099 | 5/1956 | Bruner et al. |
| 2,942,116 | 6/1960 | Axelrad _____ 252—478 X |
| 2,987,488 | 6/1961 | Clark _____ 252—478 |
| 2,988,522 | 6/1961 | Smith et al. _____ 252—478 |
| 3,106,535 | 10/1963 | Blanco _____ 252—478 |
| 3,202,619 | 8/1965 | Le Baron _____ 252—478 |
| 3,261,800 | 7/1966 | Collins _____ 252—478 X |

BENJAMIN R. PADGETT, Primary Examiner

S. J. LECHERT, JR., Assistant Examiner

U.S. Cl. X.R.

250—108